US008396737B2

(12) United States Patent
Lakshminarayan et al.

(10) Patent No.: US 8,396,737 B2
(45) Date of Patent: Mar. 12, 2013

(54) WEBSITE ANALYSIS COMBINING QUANTITATIVE AND QUALITATIVE DATA

(75) Inventors: Choudur K. Lakshminarayan, Austin, TX (US); Alan E. Benson, Houston, TX (US); Qingfeng Yu, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1628 days.

(21) Appl. No.: 11/358,376

(22) Filed: Feb. 21, 2006

(65) Prior Publication Data

US 2007/0198321 A1    Aug. 23, 2007

(51) Int. Cl.
G06Q 30/00    (2012.01)
(52) U.S. Cl. ...................................................... 705/7.29
(58) Field of Classification Search .................... 705/10, 705/7.29
See application file for complete search history.

(56) References Cited

U.S. PATENT DOCUMENTS

| | | | | |
|---|---|---|---|---|
| 6,782,423 | B1 * | 8/2004 | Nakayama et al. | 709/224 |
| 6,850,988 | B1 * | 2/2005 | Reed | 709/238 |
| 6,877,007 | B1 * | 4/2005 | Hentzel et al. | 709/224 |
| 7,454,705 | B2 * | 11/2008 | Cadez et al. | 715/700 |
| 7,673,019 | B2 * | 3/2010 | Chi et al. | 709/219 |
| 2003/0018584 | A1 * | 1/2003 | Cohen et al. | 705/52 |
| 2003/0160820 | A1 | 8/2003 | Marshall | |
| 2004/0054682 | A1 * | 3/2004 | Kano | 707/100 |
| 2004/0059746 | A1 * | 3/2004 | Error et al. | 707/102 |
| 2005/0125382 | A1 | 6/2005 | Karnawat et al. | |
| 2005/0177413 | A1 * | 8/2005 | Blumberg et al. | 705/10 |
| 2006/0015504 | A1 * | 1/2006 | Yu et al. | 707/10 |
| 2007/0150322 | A1 * | 6/2007 | Falchuk et al. | 705/7 |
| 2008/0306830 | A1 * | 12/2008 | Lasa et al. | 705/26 |

FOREIGN PATENT DOCUMENTS

| | | | |
|---|---|---|---|
| KR | 2005 0005591 A | 1/2005 | |
| WO | 96/41495 A | 12/1996 | |
| WO | 98/38614 A | 9/1998 | |
| WO | 01/71520 A | 9/2001 | |

OTHER PUBLICATIONS

Alan L. Montgomery, et al., "Modeling Online Browsing and Path Analysis Using Clickstream Data," Marketing Science 23:4, pp. 579-595 (2004).*
Lin Lu, et al., "Discovery of Significant Usage Patterns from Clusters of Clickstream Data," Proceedings of the Seventh International Workshop on Knowledge Discovery from the Web 68-79 (2005).*
Choudur K. Lakshminarayan and Qingfeng Yu, "A Novel Two-Stage Clustering Approach for Visitor Segmentation and Prediction Based on Click Stream Attributes" (2001), available at http://www.sas.com/images/email/aiglobal/062004/iiitb_clustering.pdf.*
Wendy W. Moe, "Buying, Searching, or Browsing: Differentiating Between Online Shoppers Using In-Store Navigational Clickstream," Journal of Consumer Psychology, vol. 13, Iss. 1 & 2, pp. 29-39 (2003).*
Igor Cadez, et al., "Model-Based Clustering and Visualization of Navigation Patterns on a Web Site," 7 Data Mining and Knowledge Discovery 399-424 (2003).*

(Continued)

Primary Examiner — Jonathan G Sterrett
Assistant Examiner — Stephanie Delich

(57) ABSTRACT

Systems, methods, media, and other embodiments associated with predicting website user satisfaction based on current actions analyzed in light of combined quantitative and qualitative data are described. One example system embodiment includes logic for acquiring both quantitative website usage data and qualitative website satisfaction data. The example system also includes logic for creating a satisfaction categorization data from the quantitative website usage data and the qualitative website satisfaction data.

23 Claims, 6 Drawing Sheets

OTHER PUBLICATIONS

Igor Cadez, et al., "Visualization of Navigation Patterns on a Web Site Using Model-Based Clustering," Proceedings of the Sixth ACM SIGKDD International Conference on Knowledge Discovery and Data Mining, 280-284 (2000).*

Corin R. Anderson, et al., "Relational Markov Models and Their Application to Adaptive Web Navigation," Proceedings of the Eighth ACM SIGKDD International Conference on Knowledge Discovery and Data Mining, 143-152 (2002).*

Erika Blanc and Paolo Giudici, "Sequence Rules for Web Clickstream Analysis," 2394 Lecture Notes in Computer Science 1-14 (2002).*

Jose Borges and Mark Levene, "Generating Dynamic Higher-Order Markov Models in Web Usage Mining," 3721 Lecture Notes in Computer Science 34-45 (2005).*

Jia, Hu et al, "Clickstream Log Acquisition with Web Farming", 2005 IEEE/WIC/ACM Int'l Conf on Compiegne, France, Sep. 19-22, 2005, pp. 257-263.

Lee, J et al, "Visualization and Analysis of Clickstream Date of Online Stores for Understanding Web Merchandising", www.research.ib.com, Jan. 1, 2000.

* cited by examiner

WEBSITE ANALYSIS COMBINING QUANTITATIVE AND QUALITATIVE DATA

COPYRIGHT NOTICE

A portion of the disclosure of this patent document contains material that is subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

As web-based e-commerce has flourished, website usage tracking has become an important tool for economic analysis. Traditionally, summary statistics including page views, click-throughs, purchase conversion (e.g., where a page viewer becomes a purchaser) and so on, have been compiled from a limited sample of web page visits. Statistics concerning customer and/or visitor satisfaction has also been acquired for websites. Typically a visitor may be offered some reward (e.g., discount coupon) in return for spending the time required to complete a satisfaction survey or a "focus group" may be retained to answer questions concerning a website. Thus, direct customer feedback concerning satisfaction level has been acquired. Conventionally, customer feedback data has not been collected from all website visitors.

Although websites are increasingly becoming crucial elements in corporate business models, traditional methods for measuring effectiveness in terms of revenue generation and customer satisfaction are limited. Thus, e-commerce site owners may have made decisions concerning their websites based on uncorrelated limited quantitative data and/or limited summary quantitative data. Additionally, these decisions may have been either completely objectively based on quantitative data or completely subjectively based on qualitative data.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
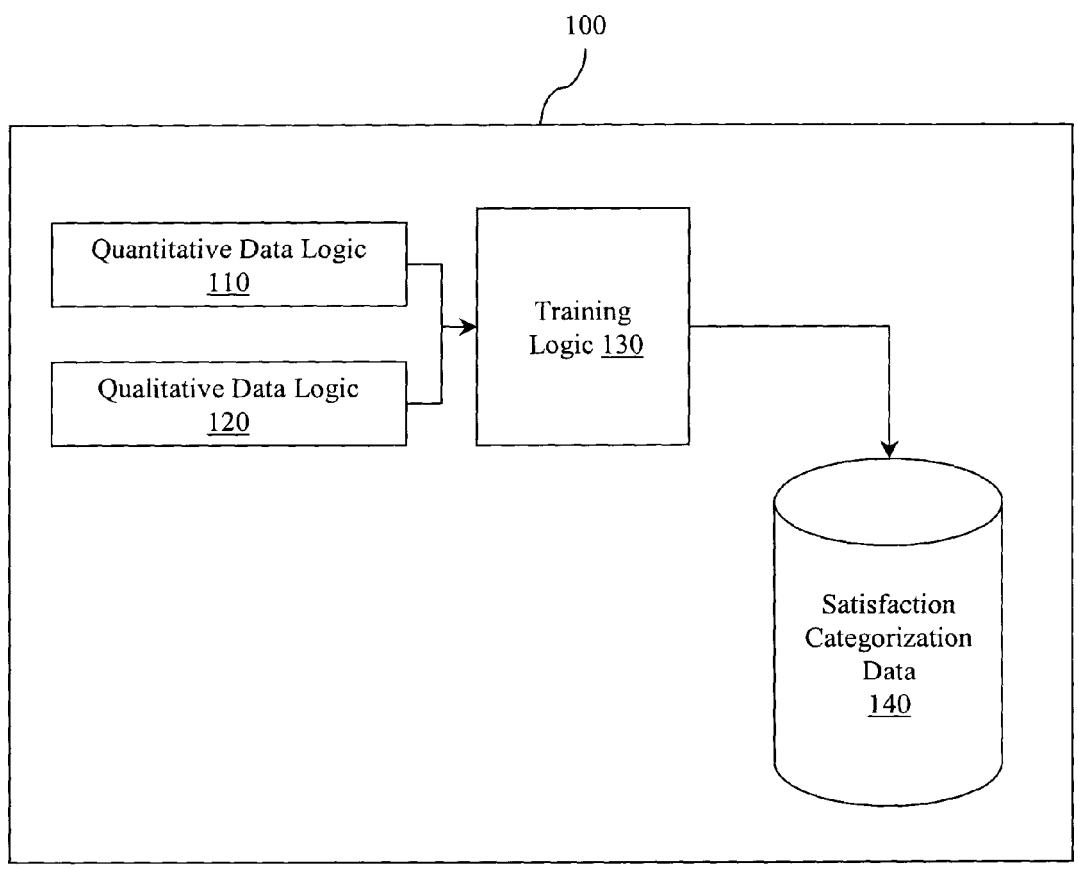
FIG. 1 illustrates an example system associated with website analysis based on combined quantitative and qualitative data.

Example systems and methods combine analysis of quantitative data with analysis of qualitative data to not only analyze what has happened in the past satisfaction-wise in regards to a website but also to predict the degree of satisfaction a current visitor is experiencing with a website. Example systems and methods may selectively take an action(s) based on that degree of satisfaction. In one example, rather than base satisfaction decisions and/or one-to-one marketing actions on traditional data samples, all or substantially all website visit data may be considered as it arrives. In one example, "click-stream" data will be analyzed in a context determined by customer satisfaction data. The context will take the perspective that a good website navigation experience yields a high customer satisfaction. A good website navigation experience may be determined by customer feedback and/or actions (e.g., purchases) taken during a navigation. Therefore, session-level page sequence data may be correlated to high/low satisfaction data.

In one example, survey satisfaction data and quantitative data (e.g., conversions vs. abandonments) may be used to train up a classifier that may then be used to predict customer satisfaction with subsequent website visits. The prediction may be based on a sequence of web pages viewed during the session. For example, certain sequences may typically lead to a purchase. In some cases, a purchase alone may be equated with a high satisfaction experience. Additionally and/or alternatively, certain sequences may be correlated with high satisfaction data acquired from customer feedback and thus categorized as being a potential high satisfaction session. Thus the correlations may be used by the classifier to predict satisfaction levels associated with on-going visits. In one example, transitions between pages in sequences may be analyzed using first order Markov chains. Different approaches to computing conditional probabilities and handling missing page transitions may be taken in different examples.

Example systems and methods may also facilitate taking actions based on the satisfaction prediction for an ongoing visit and/or for a set of ongoing visits. At its most basic, a signal may be generated to indicate that a user is having a good or bad experience. Downstream components may then respond to the signal. In a different example, individual session level actions intended to enhance the user experience may be taken. For example, actions that enhance a one-to-one marketing experience or that increase the likelihood of finalizing a sale (e.g., offering a discount), and so on, may be taken.

In addition to actions directed at an ongoing session, larger scale decisions may also be made based on analysis of combined quantitative and qualitative data. For example, decisions concerning website redesign, sales promotion effectiveness, website designer compensation (e.g., bonus) and so on may be made based on overall satisfaction levels. By way of illustration, a set of pages associated with a promotion may consistently be generating low satisfaction experiences and low sales and thus may be discontinued. By way of further illustration, a set of pages may produce sequences that lead to both high customer satisfaction and significant sales and thus the page designer(s) may receive a bonus.

Example systems and methods examine more complete sets of both quantitative and qualitative data to facilitate predicting session satisfaction levels. Satisfaction data may also be used at the individual level to customize a user interaction and/or at the aggregate level to incentivize designers, developers, and so on. Additionally, low-level decisions concerning an ongoing session can be made as can high-level decisions concerning overall site effectiveness.

Example systems and methods may treat predicting customer satisfaction based on web page visitation sequences as a classification problem. Thus, a set of training data may be used to extract data that identifies high and low satisfaction sessions. The training data may include a set of observations. In one example, an observation may include a sequence of pages visited during a customer session and for each visited page an associated binary valued satisfaction category variable. (e.g., 0=low satisfaction, 1=high satisfaction). The value of the binary valued satisfaction category variable may be based on direct user feedback (e.g., reporting high satisfaction level on a user survey) and/or on other interpretative feedback (e.g., user is repeat buyer using same sequence previously used to get to purchase, user is daily visitor).

Predictions may be based on the results extracted from the training data. For example, to predict the class (e.g., low, high) of a current session, its page sequence can be compared to analyzed page sequences and when a match is found the classification for the analyzed sequence can be assigned to the ongoing sequence. Since ongoing sequences may be shorter than complete analyzed sequences, partial sequences can be assigned a classification based on the probability that the ongoing sequence will result in a known, analyzed sequence.

An example method includes acquiring a set of training data for building a classifier. The training data may include a number of individual session-level page sequences with corresponding class labels. In the training data, customer sessions that yield high or low ratings may be separated into two groups. Unique transitions between web pages can be extracted from sessions in each of the two groups. The transitions provide one way to partition the available data. In one example, first order Markov chains can be used to analyze the transitions. With the amount of information available from greater sets of user data, focusing on transitions facilitates restricting the data space. The labeled unique page transitions can be used as canonical units of analysis in a two class classification problem setting. The training data for the two class classification problem can include the two categories of individual sessions identified by session identifiers, sequences of pages clicked, sequence numbers that facilitate tracking temporal ordering of pages accessed by a user, and corresponding class labels. Page sequences in the categories are used to build prototype one-step page transitions that can help describe user sessions.

The following text describes techniques and methods associated with establishing categories and predicting a category for an ongoing session. For a given class, consider a set S of all the sessions in the given class where P=the number of unique pages in S. Create a P×P matrix M whose element P(i,j) is the number ($n_{ij}$) of one-step transitions between $P_i$ and $P_j$ in both directions. A one step transition is a movement between page $P_i$ and page $P_j$ in one click. The probability $P_{ij}$ of a transition between $P_i$ and $P_j$ is given by:

$$\theta_{ij} = \frac{n_{ij}}{\sum_{j=1}^{n} n_{ij}} \quad \text{Formula 1.0}$$

Consider the pages as nodes with edges between the nodes representing traffic between the pages. A high satisfaction prototype can be defined as a sequence of highest frequency one-step transitions in set S associated with high satisfaction sessions. For a two class classification problem (e.g., G={1, 2}), extract pages exceeding a pre-defined and in some cases configurable threshold (e.g., user satisfaction level >x). In one example, a threshold can be based on the number of transitions between any two pages "i" and "j" exceeding a certain threshold. The extracted sequences of one step page transitions define prototype sequences for the given class. Thus, let $N_g = \{(P_i, P_j): (P_i\text{->}P_j) >= \eta\}$ Let $n_h$ and $n_i$ be the number of one-step transitions in $G_1$ and $G_2$. Let $L=P_{i1}, P_{i2}, \ldots P_{ik}$ be the page sequence corresponding to a session $S_i$ i=1, 2, ... $n_v$, $n_v$ being the number of sessions in the validation set. Extract all one step page transitions $P_{ij}\text{->}P_{ik}$ from L. Let $V_i$ be the set $\{(P_{j1}, P_{jk}): (P_{i1}\text{->}P_{ik})=1\}$. Let k be the number of one step transitions in $V_i$. Using sets $N_1$, $N_2$, and $V_i$, enumerate the number of common one-step sequences between $N_i$ and $V_i$ and between $N_2$ and $V_i$. Let $N_{1i}$ and $N_{2i}$ be the number of common one step pages sequences, for example:

$N_{1i} = \#(N_1 \cap V_i)$ $N_{2i} = \#(N_2 \cap V_i)$

Decide whether to assign sequence L to $G_1$ or $G_2$ by examining $d_1(L) = \arg_j \max(\pi_j)$ where $$\pi_1 = \frac{N_{1i}}{n_h} \text{ and } \pi_2 = \frac{N_{2i}}{n_1}$$

Thus, if $\pi_1 > \pi_2$ assign session $S_i$ to class $G_1$, otherwise assign it to class $G_2$. The rational for $\pi_1$ and $\pi_2$ concerns accounting for the number of typical transitions in each class G being unequal. Therefore, the denominator adjusts for the difference and results in the ratios being normalized proportions.

With these equations and explanations in hand, an example process for training a classifier and classifying sessions can now be described. While this process includes several actions, it is to be appreciated that other equivalent processes may include a greater or lesser number of actions and that various actions may be broken into smaller sub-actions and/or combined into larger actions. The process may include:

- segregating high satisfaction sessions and low satisfaction sessions into two classes (high satisfaction, low satisfaction)
- Converting sessions in each class (high, low) into a set of unique pages $P_i$, i=1, 2, ... P
- In each class, counting the number of one-step transitions between unique pages $P_i$ and $P_j$,
- Retaining within each class page transitions appearing more than a threshold η number of times
- Establishing a prototype(s) within each class of set(s) of one-step transitions that exceed threshold "η"
- Converting session data to a sequence of one-step transitions
- Counting the number of one-step page transition matches between the prototype in each class and the one-step transitions, and
- Computing a normalized probability of a match between the one-step transitions and the prototypes and assigning the session to the class for which the match probability is greater.

In one example, page sequences may be analyzed using Markov chains. Discrete space Markov chains can facilitate examining the probability of a transition within a group. Thus, discrete space Markov chains can facilitate identifying the likelihood that a current sequence does or will match another stored sequence. A Markov chain is a discrete time stochastic process $\{X_n, n=0, 1, 2, \ldots\}$ that assures a finite (e.g., countable) number of possible values such that:

$$P(X_{n+1}=j|x_n=i, x_{n-1}=i_{n-1}, \ldots X_0=i_0)=$$

$$P(X_{n+1}=j|x_n=i)=P_{ij}$$

A Markov chain concerns the conditional probability distribution of future state j at time n+1 given the present state at time n and past states at times n−1, n−2, . . . 2, 1, 0 is independent of the states before the present state "i" at time n. Let $p_1, p_2, \ldots p_n$ be the page sequence of a new unlabelled session. The probability that the sequence belongs to a class is given by $$\text{prob}(p_1, p_2, \ldots p_n|G_g)=$$

$$\text{prob}(p_1)\,\text{prob}(p_2|p_1, G_g) \ldots \text{prob}(p_n|p_1, p_2, \ldots p_{n-1}, G_g)$$

Using first order Markov chains allows:

$$\text{prob}(p_1, p_2, \ldots p_n|G_g)=$$

$$\text{prob}(p_1)\,\text{prob}(p_2|p_1, G_g) \ldots \text{prob}(p_n|p_{n-1}, G_g) \qquad \text{Formula 2.0}$$

Conditional probabilities in formula 2.0 can be computed using:

$$\theta_{ij} = \frac{n_{ij}}{\sum_{j=1}^{n} n_{ij}} \qquad \text{Formula 1.0}$$

Thus, the sequence can be assigned to a class based on $$d_2(L)=\arg_g \max(\text{prob}(p_1, p_2 \ldots p_n|G_g))\ g=1,2$$

Sometimes, a sequence being studied may include a transition that has not been handled in previously examined data. To handle this case, compute the probability of a missing transition $P_x \rightarrow p_y$ using:

$$\frac{1}{N_x+2}$$

where $N_x$=the number of all possible one-step transitions from $p_x$. The imputed probability is the expectation of a missing one-step transition probability based on a beta-binomial model. The expected value is an approximation of the probability of a transition from a given state "i" to a missing state "j". In one example, the imputed value of the transition $p_x \rightarrow p_y$ in one class may be greater than the probability of the same transition in the other class. Thus, in one example, the value used for the missing transition may be given by:

$$\min\left(\frac{1}{N_x+2}, \theta_{xy}\right)$$

This heuristic may be applied in situations where it is assumed that transitions to other pages exist from page $p_x$. If both $p_x$ and $p_y$ are absent, then the estimated probability of a transition is given as:

$$\frac{1}{N_g+2}$$

where $N_g$ is the number of all possible one-step transitions in group $G_g$, g=1,2.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer component", as used herein, refers to a computer-related entity (e.g., hardware, firmware, software, combinations thereof). Computer components may include, for example, a process running on a processor, a processor, an object, an executable, a thread of execution, a program, and a computer. A computer component(s) may reside within a process and/or thread. A computer component may be localized on one computer and/or may be distributed between multiple computers.

"Computer-readable medium", as used herein, refers to a medium that participates in directly or indirectly providing signals, instructions and/or data that can be read by a computer. A computer-readable medium may take forms, including, but not limited to, non-volatile media (e.g., optical disk, magnetic disk), volatile media (e.g., semiconductor memory, dynamic memory), and transmission media (e.g., coaxial cable, copper wire, fiber optic cable, electromagnetic radiation). Common forms of computer-readable mediums include floppy disks, hard disks, magnetic tapes, CD-ROMs, RAMs, ROMs, carrier waves/pulses, and so on. Signals used to propagate instructions or other software over a network, like the Internet, can be considered a "computer-readable medium."

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between multiple logical and/or physical entities.

"Logic", as used herein, includes but is not limited to hardware, firmware, software and/or combinations thereof to perform a function(s) or an action(s), and/or to cause a function or action from another logic, method, and/or system. Logic may include a software controlled microprocessor, discrete logic (e.g., application specific integrated circuit (ASIC)), an analog circuit, a digital circuit, a programmed logic device, a memory device containing instructions, and so on. Logic may include a gate(s), a combinations of gates, other circuit components, and so on. In some examples, logic may be fully embodied as software. Where multiple logical logics are described, it may be possible in some examples to incorporate the multiple logical logics into one physical logic. Similarly, where a single logical logic is described, it may be possible in some examples to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more computer instructions and/or processor instructions that can be read, interpreted, compiled, and/or executed by a computer and/or processor. Software causes a computer, processor, or other electronic device to perform functions, actions and/or behave in a desired manner. Software may be embodied in various forms including routines, algorithms, modules, methods, threads, and/or programs. In different examples software may be embodied in separate applications and/or code from dynamically linked libraries. In different examples, software may be implemented in executable and/or loadable forms including, but not limited to, a stand-alone program, a function call (local and/or remote), a servelet, an applet, instructions stored in a memory, part of an operating system, and so on. In different examples, computer-readable and/or executable instructions may be located in one logic and/or distributed between multiple communicating, co-operating, and/or parallel processing logics and thus may be loaded and/or executed in serial, parallel, massively parallel and other manners.

Suitable software for implementing various components of example systems and methods described herein may be developed using programming languages and tools (e.g., Java, C, C#, C++, C, SQL, APIs, SDKs, assembler). Software, whether an entire system or a component of a system, may be embodied as an article of manufacture and maintained or provided as part of a computer-readable medium. Software may include signals that transmit program code to a recipient over a network or other communication medium. Thus, in one example, a computer-readable medium may be signals that represent software/firmware as it is downloaded from a server (e.g., web server).

"User", as used herein, includes but is not limited to, one or more persons, software, computers or other devices, or combinations of these.

Some portions of the detailed descriptions that follow are presented in terms of algorithm descriptions and representations of operations on electrical and/or magnetic signals capable of being stored, transferred, combined, compared, and otherwise manipulated in hardware. These algorithmic descriptions and representations are the means used by those skilled in the art to convey the substance of their work to others. An algorithm is here, and generally, conceived to be a sequence of operations that produce a result. The operations may include physical manipulations of physical quantities.

It has proven convenient at times, principally for reasons of common usage, to refer to these electrical and/or magnetic signals as bits, values, elements, symbols, characters, terms, numbers, and so on. These and similar terms are associated with appropriate physical quantities and are merely convenient labels applied to these quantities. Unless specifically stated otherwise, it is appreciated that throughout the description, terms including processing, computing, calculating, determining, displaying, automatically performing an action, and so on, refer to actions and processes of a computer system, logic, processor, or similar electronic device that manipulates and transforms data represented as physical (electric, electronic, magnetic) quantities.

FIG. 1 illustrates a system 100. System 100 includes a quantitative data logic 110 that is configured to acquire a quantitative data associated with a website. In different examples, the quantitative data may include a count of page visits, a count of site conversions, a count of site abandonments, an average site visit time, an average page visit time, an average page sequence length, and so on. It is to be appreciated that different sets of quantitative data may include different numbers and/or amounts of quantitative measurements. In different examples, the quantitative data may be updated with measurements acquired from ongoing sessions.

System 100 may also include a qualitative data logic 120 that is configured to acquire a qualitative data associated with the website. In different examples, the qualitative data may include an overall satisfaction data, a navigation satisfaction data, an ease of use satisfaction data, a quality of use satisfaction data, and so on. It is to be appreciated that different qualitative data sets may include a greater and/or lesser number of data points and a different mixture of data types.

System 100 may also include a training logic 130 that is configured to produce a satisfaction categorization data 140 by analyzing the quantitative data and the qualitative data. The analysis may include partitioning quantitative data, qualitative data, and/or combinations thereof into different satisfaction categories, identifying unique pages and page transitions, identifying sequences of page visits that yield high and/or low satisfaction results, and so on. In one example, a set of unique page transitions can result in a prototype page sequence for satisfied customers or a prototype page sequence for unsatisfied customers. In some examples, the analysis may include computing probabilities for sequence states using first order Markov chains.

Thus, in one example, the training logic 130 may be configured to produce the satisfaction categorization data 140 by acquiring a set of user satisfaction data and partitioning the set of user satisfaction data into two classes of satisfaction data, a first category and a second category. With the partitioned data available, the training logic 130 may then identify unique pages in the first category and identify unique pages in the second category. With the unique pages identified, interesting one-step transitions may be determined and retained with less interesting one-step transitions being logically discarded. "Retaining" a one-step transition may be a physical and/or logical action. For example, data values representing a one-step transition may be physically moved from one data store to another data store, may be marked with a flag in a data store, may be logically identified as belonging to a data set, and so on. Thus, training logic 130 may retain in the first category one-step transitions appearing more than a threshold number of times and may retain in the second category one-step transitions appearing more than the threshold number of times. In some examples, the threshold may be pre-defined and/or user configurable.

Having selected interesting one-step transitions, sequences of transitions that lead to high and/or low satisfaction results can be identified and established as "prototype sessions" to which ongoing sessions can be compared. Thus, training logic 130 may establish sets of retained one-step transitions as prototype transitions for the first category and establish sets of retained one-step transitions as prototype transitions for the second category. These prototype transitions may then be analyzed by components like those described in connection with FIG. 2.

Figure 2:
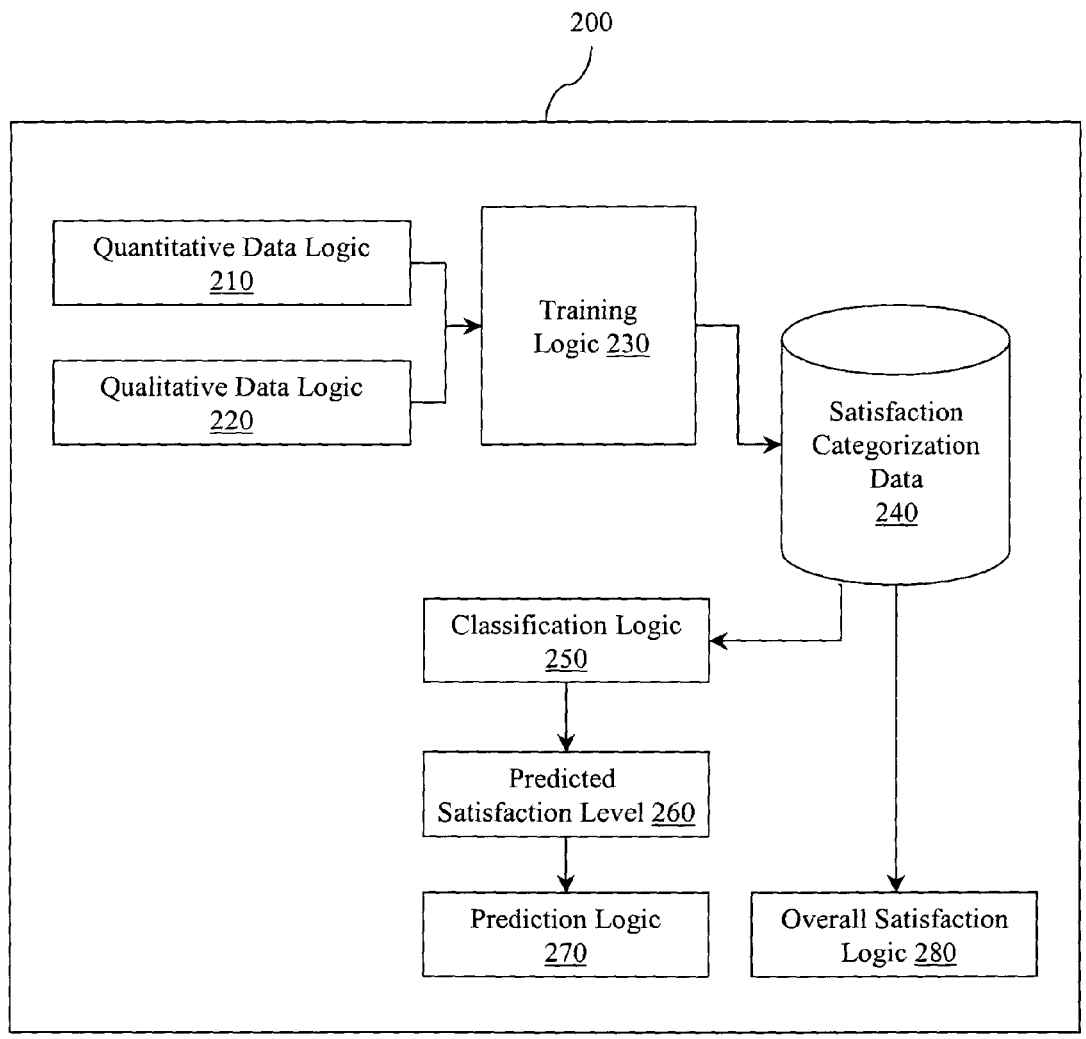
FIG. 2 illustrates an example system associated with website analysis based on combined quantitative and qualitative data.

FIG. 2 illustrates system 200. System 200 may include components (e.g., quantitative data logic 210, qualitative data logic 220, training logic 230) like those described in FIG. 1 and may produce a satisfaction categorization data 240. System 200 may also include additional components configured to use the satisfaction categorization data 240 to take actions based on a predicted satisfaction level for a user visiting a website related to the satisfaction categorization data 240.

System 200 may include a classification logic 250 that is configured to receive a session-level page sequence data associated with a current website visit and to produce a predicted user satisfaction level 260 based on the session-level page sequence data and the satisfaction categorization data 240. In one example, the session-level page sequence data may include page identifiers that identify a sequence of pages visited during the current website visit. In one example, the classification logic 250 may be configured to produce the predicted user satisfaction level based, at least in part, on a probability that the current website visit matches a visit associated with a category described in the satisfaction categorization data 240. In one example, the probability may be computed using a first order Markov chain associated with unique page transitions identified in the session-level page sequence data and in the satisfaction categorization data 240.

System 200 may also include a prediction logic 270 that is configured to select an action to take in response to the predicted user satisfaction level 260. Different actions may be selected. For example, the action may include offering a discount in a current session, offering a discount in a future session related to the current session, and making an offer in a future session related to the current session.

System 200 may also include an overall satisfaction logic 280 that is configured to rate website performance with respect to effectiveness as a sales tool based on the satisfaction categorization data 240. The overall satisfaction logic 280 may consider the satisfaction categorization data 240 at an aggregate level rather than searching for matches to individual sequences that lead to high and/or low satisfaction. For example, the overall satisfaction logic 280 may determine the ratio of high satisfaction experiences to low satisfaction experiences, trends in high satisfaction and/or low satisfaction experiences, improvements in satisfaction rankings, and so on. Then, high level decisions (e.g., redesign website, incentivize designer) may be based on aggregated satisfaction data.

Example methods may be better appreciated with reference to flow diagrams. While for purposes of simplicity of explanation, the illustrated methods are shown and described as a series of blocks, it is to be appreciated that the methods are not limited by the order of the blocks, as some blocks can occur in different orders and/or concurrently with other blocks from that shown and described. Moreover, less than all the illustrated blocks may be required to implement an example method. In some examples, blocks may be combined, separated into multiple components, may employ additional, not illustrated blocks, and so on. In other examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent executable instructions that cause a computer, processor, and/or logic device to respond, to perform an action(s), to change states, and/or to make decisions. While the figures illustrate various actions occurring in serial, it is to be appreciated that in some examples various actions could occur concurrently, substantially in parallel, and/or at substantially different points in time.

It will be appreciated that electronic and software applications may involve dynamic and flexible processes and thus that illustrated blocks can be performed in other sequences different than the one shown and/or blocks may be combined or separated into multiple components. In some examples, blocks may be performed concurrently, substantially in parallel, and/or at substantially different points in time.

Figure 3:
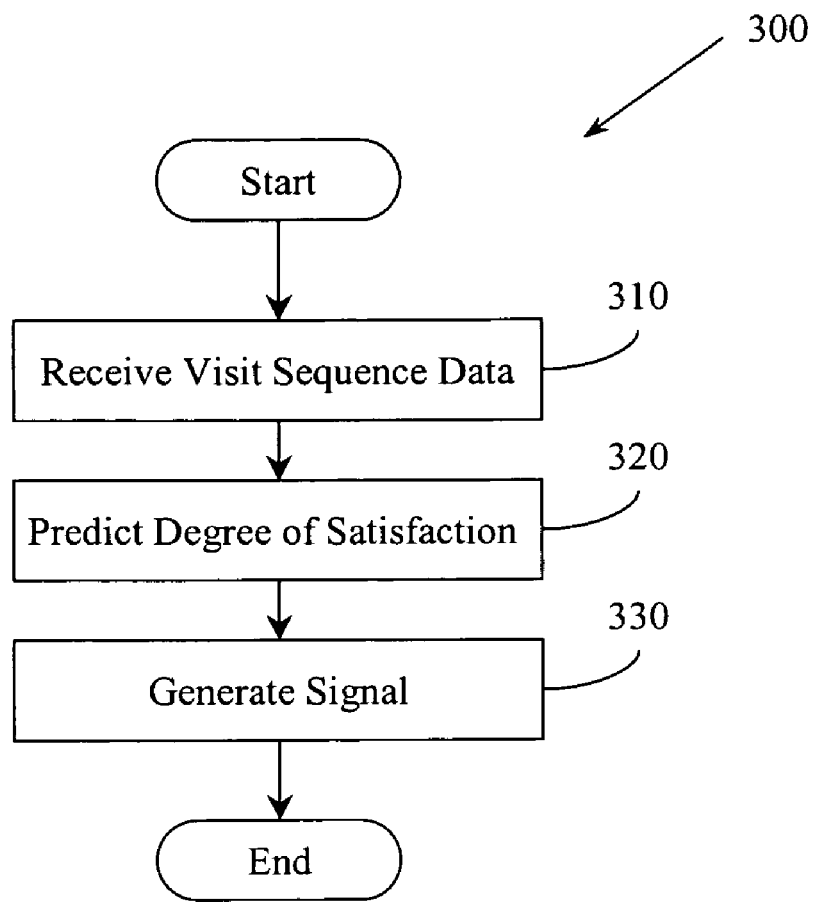
FIG. 3 illustrates an example method associated with website analysis based on combined quantitative and qualitative data.

FIG. 3 illustrates method 300. Method 300 may include, at 310, receiving a visit sequence data associated with a user visiting a website. In one example the visit sequence data may include a session identifier and an ordered set of page identifiers. In another example, the set of page identifiers may not be ordered but may include information like a time-stamp that facilitates identifying the order in which pages at a website were visited.

Method 300 may also include, at 320, predicting a degree of satisfaction for the user. The prediction may be based, at least in part, on categorizing the probability that a visit belongs to a satisfaction category. The probability may be computed by analyzing visit sequence data in light of category data.

Thus, in one example, predicting the degree of satisfaction includes computing probabilities that a user visit described by the visit sequence data belongs to various satisfaction categories. The probabilities may be based on Markov chain based analysis of prototype page transitions identified in the satisfaction categories and unique page transitions identified in the visit sequence data. Computing the probabilities using Markov chains may include computing the conditional probability of a state in a chain. Thus, in one example, a conditional probability for an element of a Markov chain may be computed according to:

$$\theta_{ij} = \frac{n_{ij}}{\sum_{j=1}^{n} n_{ij}}$$

where $n_{ij}$ is the number of bi-directional one-step transitions between a first page $P_i$ and a second page $P_j$.

Method 300 may also include, at 330, generating a signal based on the degree of satisfaction. In one example, the signal may be used to trigger customizing an offer to present to the user visiting the website. For example, if a user is having a high satisfaction experience then they may be likely to purchase additional items. Therefore, a "special volume discount" may be offered, or a related product may be offered for sale. However, if a user is having a low satisfaction experience, then they may need incentives to purchase anything. Thus, a discount may be offered or an "introductory offer" may be presented. In different examples these offers may be presented in the ongoing session and/or in connection with a future website visit.

While FIG. 3 illustrates various actions occurring in serial, it is to be appreciated that various actions illustrated in FIG. 3 could occur substantially in parallel. By way of illustration, a first process could receive visit sequence data, a second process could predict a degree of satisfaction, and a third process could generate a signal. While three processes are described, it is to be appreciated that a greater and/or lesser number of processes could be employed and that lightweight processes, regular processes, threads, and other approaches could be employed.

In one example, a method is implemented as processor executable instructions and/or operations stored on a computer-readable medium. Thus, in one example, a computer-readable medium may store processor executable instructions operable to perform a method that includes receiving a visit sequence data associated with a user visiting a website, predicting a degree of satisfaction for the user based, at least in part, on categorizing the visit sequence data as more likely belonging to one of two or more satisfaction categories, and generating a signal based on the degree of satisfaction. While the above method is described being stored on a computer-readable medium, it is to be appreciated that other example methods described herein may also be stored on a computer-readable medium.

Figure 4:
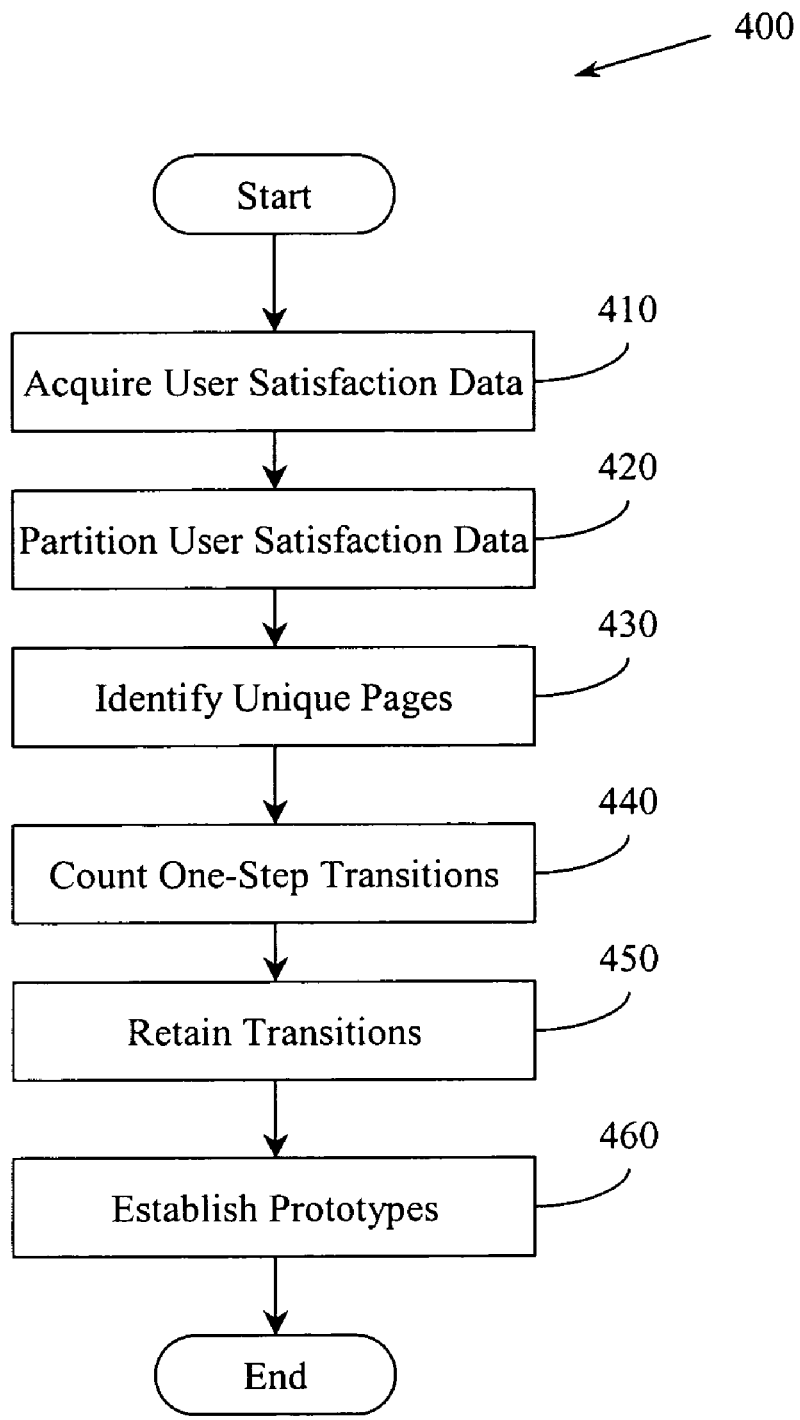
FIG. 4 illustrates an example method associated with website analysis based on combined quantitative and qualitative data.

FIG. 4 illustrates method 400 for creating satisfaction categories. A satisfaction category may capture relationships identified between quantitative and qualitative data. A satisfaction category may also facilitate identifying a degree of satisfaction likely associated with an ongoing session. A satisfaction category may therefore initially be created under user and/or programmatic control. In some examples a satisfaction category may be updated based on data received from sessions occurring after initial creation.

Method 400 may include, at 410, acquiring a set of user satisfaction data. The user satisfaction data may be acquired, for example, from user surveys, from pop-up questions presented to a user, from observed user behavior, from purchase analysis, from conversion analysis, from abandonment analysis, and so on. In different examples, the user satisfaction data may be updated over time.

Method 400 may also include, at 420, partitioning the set of user satisfaction data into two classes of satisfaction data, a first category and a second category. While two classes are described, it is to be appreciated that in other examples a greater number of categories may be employed.

Method 400 may also include, at 430, identifying unique pages in the first category and identifying unique pages in the second category. Identifying unique pages facilitates identifying unique transitions between pages. Furthermore, identifying unique pages and/or unique page transitions facilitates reducing the data space involved in subsequent computations. Identifying transitions and sequences may also facilitate computing probabilities and/or matches between sequences using Markov chain based analysis.

Method 400 may also include, at 440, counting one-step transitions that occur between unique pages. "Counting" the number of matches between one-step page transitions may occur in different manners in different examples. For example, counting may involve computing values including a Hamming distance between sequences, a limited joint probability between the sequences, a Jacquard distance between the sequences, and an edit distance between the sequences.

Method 400 may also include, at 450, retaining in the first category one-step transitions appearing more than a threshold number of times. The one-step transitions occur between unique pages in the first category. Method 400 may also, at 450, retain in the second category one-step transitions appearing more than the threshold number of times. In this case, the one-step transitions occur between unique pages in the second category. As described above, "retaining" a transition may be a physical and/or logical action that involves physically moving a data value between data structures, updating a data structure, and so on.

Method 400 may also include, at 460, establishing sets of retained one-step transitions as prototype transitions for the first category and establishing sets of retained one-step transitions as prototype transitions for the second category. Establishing a set of retained one-step transitions may be a physical and/or logical operation. For example, a physical operation may involve moving a data value from one data structure to another, adding an entry to a data structure, and so on. A logical operation may involve identifying a data value as belonging to a data set without physically moving the data value. For example, a "membership bit" related to a data value may be set to indicate its inclusion in a prototype transition sequence.

With the satisfaction categories available from method 400, closer examination may be paid to how to predict a degree of satisfaction in method 300. Consider a case where there are two satisfaction categories (e.g., a high satisfaction category, a low satisfaction category). Given the satisfaction categories, predicting the degree of satisfaction in method 300 may include computing a probability that a visit described by the visit sequence data belongs to a satisfaction category. This probability may be computed by identifying a sequence of one-step transitions in the visit sequence data, counting the number of one-step page transition matches between prototype transitions in the satisfaction category and the sequence of one-step transitions, computing a normalized probability of a match between the visit and the prototypes for the satisfaction category based, at least in part, on the number of one-step page transition matches, and categorizing the visit as belonging to a satisfaction category based on a maximum normalized probability.

While unique pages and unique page transitions may be identified, some pages and/or page transitions in an ongoing sequence may not appear in the categorization data. Thus, in some examples, the probability computations may be extended. Therefore, predicting the probability in method 300 may also include determining the probability of a transition being in a satisfaction category and/or determining the probability of a transition not being in the satisfaction category. Computing the probability may therefore also include considering the probability of a transition being in a satisfaction category and the probability of a transition not being in the satisfaction category when computing a normalized probability.

Figure 5:
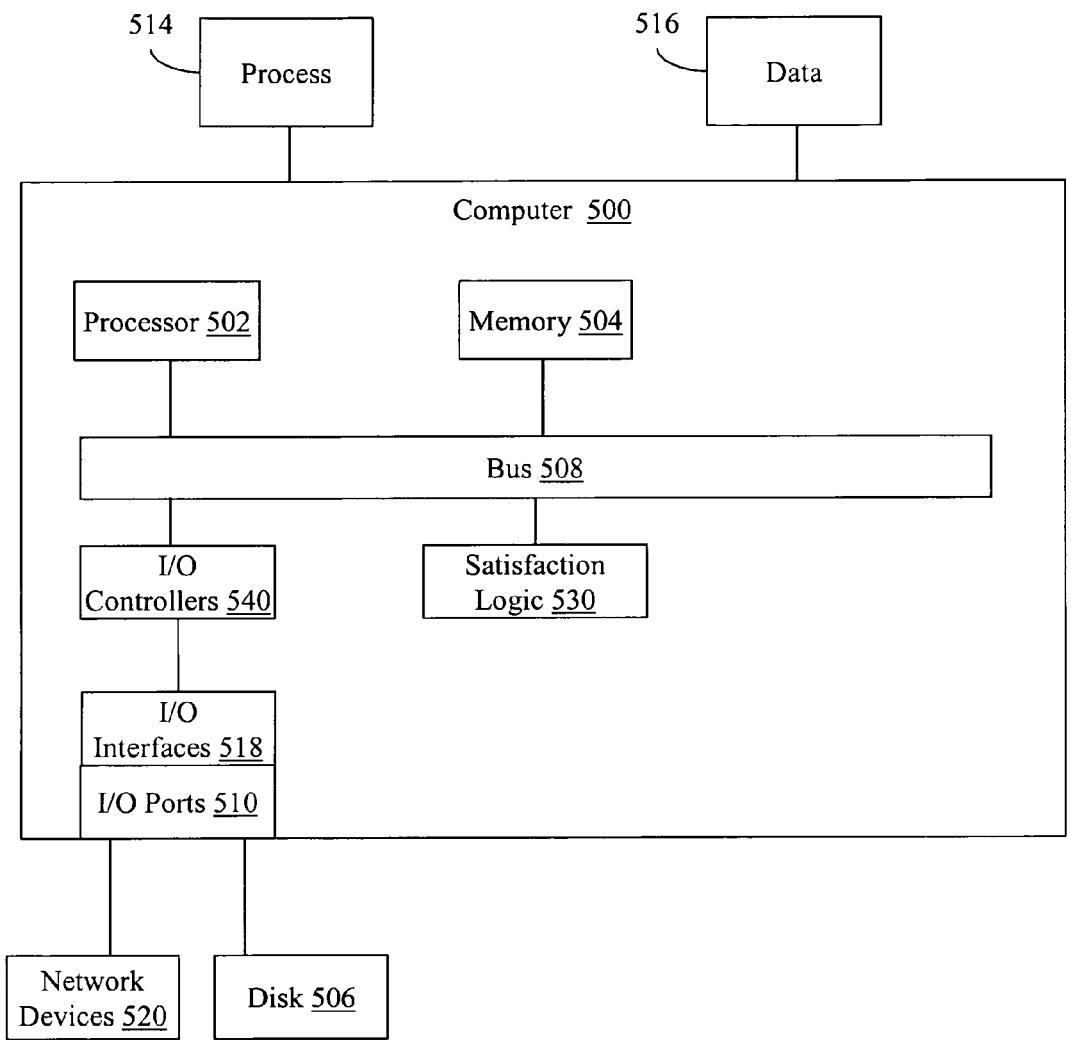
FIG. 5 illustrates an example computing environment in which example systems and methods illustrated herein may operate.

FIG. 5 illustrates an example computing device in which example systems and methods described herein, and equivalents, may operate. The example computing device may be a computer 500 that includes a processor 502, a memory 504, and input/output ports 510 operably connected by a bus 508. In one example, computer 500 may include a satisfaction logic 530 configured to facilitate predicting a website visitor satisfaction based on satisfaction categories derived from quantitative and qualitative data related to the website. In different examples, satisfaction logic 530 may be implemented in hardware, software, firmware, and/or combinations thereof. Thus, satisfaction logic 530 may provide means (e.g., hardware, software, firmware) for acquiring a quantitative website usage data, means (e.g., hardware, software, firmware) for acquiring a qualitative website satisfaction data, means (e.g., hardware, software, firmware) for creating a satisfaction categorization data from the quantitative website usage data and the qualitative website satisfaction data, and means (e.g., hardware, software, firmware) for predicting a user satisfaction level associated with a current website visit based, at least in part, on the satisfaction categorization data. While satisfaction logic 530 is illustrated as a hardware component attached to bus 508, it is to be appreciated that in one example, satisfaction logic 530 could be implemented in processor 502.

Generally describing an example configuration of computer 500, processor 502 may be a variety of various processors including dual microprocessor and other multi-processor architectures. Memory 504 may include volatile memory and/or non-volatile memory. Non-volatile memory may include, for example, ROM, PROM, EPROM, and EEPROM. Volatile memory may include, for example, RAM, synchronous RAM (SRAM), dynamic RAM (DRAM), synchronous DRAM (SDRAM), double data rate SDRAM (DDR SDRAM), and direct RAM bus RAM (DRRAM).

Disk 506 may be operably connected to the computer 500 via, for example, an input/output interface (e.g., card, device) 518 and an input/output port 510. Disk 506 may be, for example, a magnetic disk drive, a solid state disk drive, a floppy disk drive, a tape drive, a Zip drive, a flash memory card, and/or a memory stick. Furthermore, disk 506 may be a CD-ROM, a CD recordable drive (CD-R drive), a CD rewriteable drive (CD-RW drive), and/or a digital video ROM drive (DVD ROM). Memory 504 can store processes 514 and/or data 516, for example. Disk 506 and/or memory 504 can store an operating system that controls and allocates resources of computer 500.

Bus 508 may be a single internal bus interconnect architecture and/or other bus or mesh architectures. While a single bus is illustrated, it is to be appreciated that computer 500 may communicate with various devices, logics, and peripherals using other busses (e.g., PCIE, SATA, Infiniband, 1394, USB, Ethernet). Bus 508 can be types including, for example, a memory bus, a memory controller, a peripheral bus, an external bus, a crossbar switch, and/or a local bus. The local bus may be, for example, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

Computer 500 may interact with input/output devices via i/o interfaces 518 and input/output ports 510. Input/output devices may be, for example, a keyboard, a microphone, a pointing and selection device, cameras, video cards, displays, disk 506, network devices 520, and so on. Input/output ports 510 may include, for example, serial ports, parallel ports, and USB ports.

Computer 500 can operate in a network environment and thus may be connected to network devices 520 via i/o devices 518, and/or i/o ports 510. Through the network devices 520, computer 500 may interact with a network. Through the network, computer 500 may be logically connected to remote computers. Networks with which computer 500 may interact include, but are not limited to, a local area network (LAN), a wide area network (WAN), and other networks. In different examples, network devices 520 may connect to LAN technologies including, for example, fiber distributed data interface (FDDI), copper distributed data interface (CDDI), Ethernet (IEEE 802.3), token ring (IEEE 802.5), wireless computer communication (IEEE 802.11), and Bluetooth (IEEE 802.15.1). Similarly, network devices 520 may connect to WAN technologies including, for example, point to point links, circuit switching networks (e.g., integrated services digital networks (ISDN)), packet switching networks, and digital subscriber lines (DSL).

Figure 6:
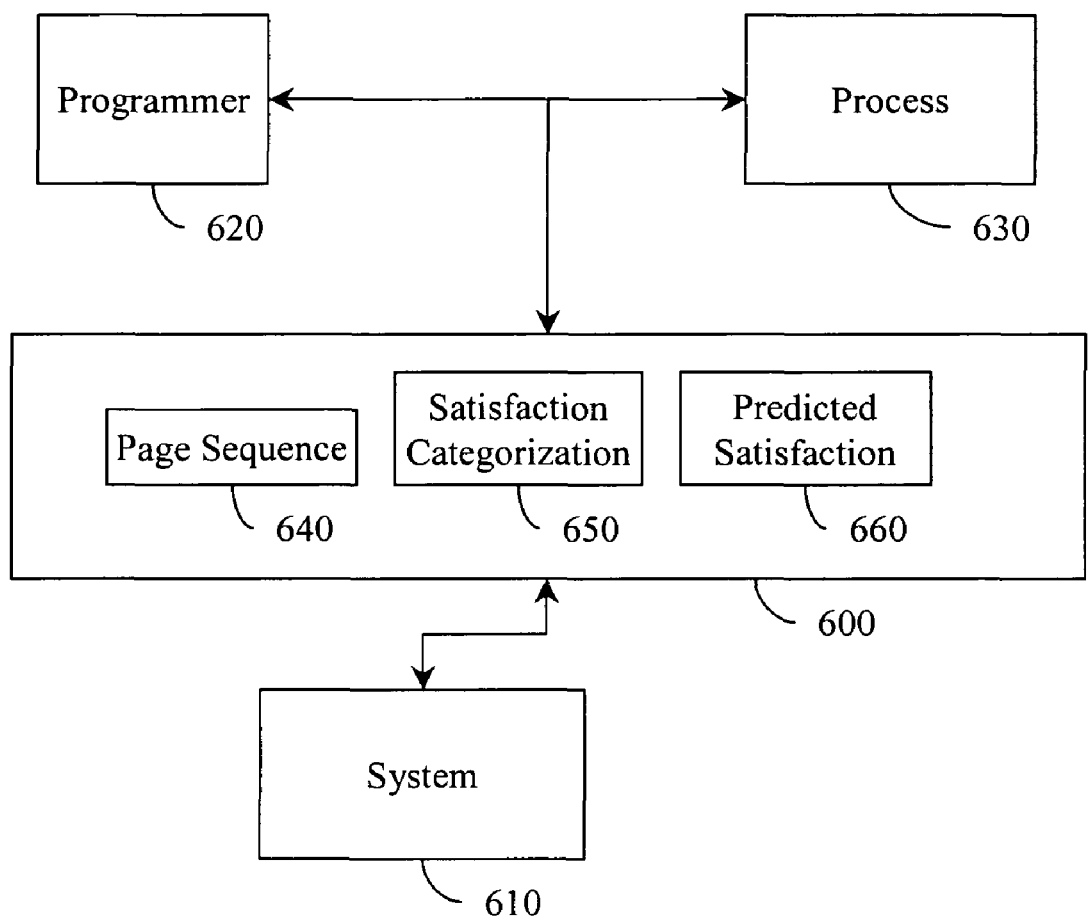
FIG. 6 illustrates an example application programming interface (API).

FIG. 6 illustrates an application programming interface (API) 600 that provides access to a system 610 configured to predict website user satisfaction using page transition analysis based on satisfaction categories derived from quantitative and qualitative data. API 600 can be employed, for example, by a programmer 620 and/or a process 630 to gain access to processing performed by system 610. For example, programmer 620 can write a program to access system 610 (e.g., invoke its operation, monitor its operation, control its operation) where writing the program is facilitated by the presence of API 600. Rather than programmer 620 having to understand the internals of system 610, programmer 620 merely has to learn the interface to system 610. This facilitates encapsulating the functionality of system 610 while exposing that functionality.

API 600 may facilitate providing data values to system 610 and/or may facilitate retrieving data values from system 610. For example, a process 630 that processes page sequence data can provide that data to system 610 via API 600 by using a call provided in API 600. In one example, an API 600 can be stored on a computer-readable medium. Interfaces in API 600 can include, but are not limited to, a first interface 640 that communicates a page sequence data, a second interface 650 that communicates a satisfaction categorization data, and a third interface 660 that communicates a predicted website satisfaction data based on analyzing the page sequence data in light of the satisfaction categorization data. The page sequence data may include, for example, a session identifier, a time-ordered set of page identifiers, a count of page transitions, and so on. The satisfaction categorization data may include, for example, prototype transition sequences associated with high and/or low satisfaction sessions. The predicted website satisfaction data may include, for example, a signal concerning of which category, if any, the session is likely to be a member and a probability of that membership.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methods for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:
1. A system, comprising:
 a quantitative data logic including hardware configured to acquire a quantitative data associated with a website;
 a qualitative data logic including hardware configured to acquire a qualitative data associated with the website;
 a training logic including hardware configured to produce a satisfaction categorization data based on partitioning the quantitative data and the qualitative data into satisfaction categories, identifying unique pages of the website, identifying one-step transitions between unique pages, establishing a prototype as a sequence of one-step transitions between unique pages in either direction in one click that exceed a threshold quantity, and associating the prototype with one of the satisfaction categories; and a classification logic configured to predict a user satisfaction level based on session-level page sequence data associated with an ongoing website visit and the prototype for the satisfaction categories; and a prediction logic configured to select an action responsive to the predicted user satisfaction level during the ongoing website visit.

2. The system of claim 1, the quantitative data comprising one or more of, a set of unique page transitions resulting in a prototype page sequence for satisfied customers and a prototype page sequence for unsatisfied customers, a count of page visits, a count of site conversions, a count of site abandonments, an average site visit time, an average page visit time, and an average page sequence length.

3. The system of claim 1, the qualitative data comprising one or more of, an overall satisfaction data, a navigation satisfaction data, an ease of use satisfaction data, and a quality of use satisfaction data.

4. The system of claim 1, the training logic being configured to produce the satisfaction categorization data by:
acquiring a set of user satisfaction data;
partitioning the set of user satisfaction data into two classes of satisfaction data, a first category and a second category;
identifying unique pages in the first category;
identifying unique pages in the second category;
retaining in the first category unique page one-step transitions in either direction appearing more than a threshold number of times, the unique page one-step transitions in either direction occurring between unique pages in the first category;
retaining in the second category unique page one-step transitions in either direction appearing more than the threshold number of times, the unique page one-step transitions in either direction occurring between unique pages in the second category;
establishing sets of retained unique page one-step transitions as prototype transitions for the first category; and
establishing sets of retained unique page one-step transitions as prototype transitions for the second category.

5. The system of claim 1, the session-level page sequence data comprising one or more page identifiers configured to identify a sequence of pages visited during the current website visit.

6. The system of claim 5, the classification logic being configured to produce the predicted user satisfaction level based, at least in part, on a probability that the current website visit matches a category described in the satisfaction categorization data, the probability being computed using a first order Markov chain associated with unique page transitions in either direction identified in the session-level page sequence data and in the satisfaction categorization data.

7. The system of claim 1, the action including one or more of, offering a discount in a current session, offering a discount in a future session related to the current session, and making an offer in a future session related to the current session.

8. The system of claim 1, including an overall satisfaction logic configured to rate website performance with respect to effectiveness as a sales tool based on the satisfaction categorization data.

9. The system of claim 1, wherein training logic including hardware is further configured to produce a satisfaction categorization data based on associating the prototype with one of the satisfaction categories based on customer feedback other than actions taken during the ongoing website visit.

10. A system, comprising:
a quantitative data logic including hardware configured to acquire a quantitative data associated with a website, the quantitative data comprising one or more of, a count of page visits, a count of site conversions, a count of site abandonments, an average site visit time, an average page visit time, and an average page sequence length;
a qualitative data logic including hardware configured to acquire a qualitative data associated with the website, the qualitative data comprising one or more of, an overall satisfaction data, a navigation satisfaction data, an ease of use satisfaction data, and a quality of use satisfaction data;
a training logic including hardware configured to produce a satisfaction categorization data based on partitioning the quantitative data and the qualitative data into satisfaction classes, the training logic being configured to produce the satisfaction categorization data by:
acquiring a set of user satisfaction data;
partitioning the set of user satisfaction data into two classes of satisfaction data, a first category and a second category;
identifying unique pages in the first category;
identifying unique pages in the second category;
retaining in the first category one-step transitions between unique pages in either direction in one click that appear more than a threshold number of times, the one-step transitions occurring between unique pages in the first category;
retaining in the second category one-step transitions between unique pages in either direction in one click that appear more than the threshold number of times, the one-step transitions occurring between unique pages in the second category;
establishing sets of retained one-step transitions between unique pages in either direction as prototype transitions for the first category; and
establishing sets of retained one-step transitions between unique pages in either direction as prototype transitions for the second category;
a classification logic including hardware configured to receive a session-level page sequence data associated with a current website visit and to produce a predicted user satisfaction level based on the session-level page sequence data and the satisfaction categorization data, the session-level page sequence data comprising one or more page identifiers configured to identify a sequence of pages visited during the current website visit, the classification logic being configured to produce the predicted user satisfaction level based, at least in part, on a probability that the current website visit matches a category described in the satisfaction categorization data, the probability being computed using a first order Markov chain associated with transitions between unique pages in either direction in one click identified in the session-level page sequence data and in the satisfaction categorization data; and
a prediction logic including hardware configured to selectively determine an action to take in response to the predicted user satisfaction level during the current website visit.

11. A system, comprising:
means for acquiring a quantitative website usage data;
means for acquiring a qualitative website satisfaction data;

means for creating a satisfaction categorization data from the quantitative website usage data and the qualitative website satisfaction data; and means for predicting a user satisfaction level associated with a current website visit based, at least in part, on partitioning the satisfaction categorization data into satisfied and unsatisfied satisfaction categories, identifying unique pages, identifying one-step transitions between unique pages in either direction in one click, and establishing a prototype page sequence of one-step transitions between unique pages in either direction in one click that exceed a threshold quantity for each of a satisfied and unsatisfied satisfaction categories.

12. A set of application programming interfaces embodied on a non-transitory computer-readable medium for execution by a computer component in conjunction with predicting a user satisfaction level associated with a website visit, comprising:

a first interface for communicating a page sequence data;

a second interface for communicating a satisfaction categorization data; and a third interface for communicating a predicted website satisfaction data during an ongoing website visit produced by analyzing the page sequence data in terms of the satisfaction categorization data, including identifying unique pages, identifying one-step transitions between unique pages, and establishing a prototype page sequence of one-step transitions between unique pages in either direction exceeding a threshold quantity for each of a satisfied and unsatisfied satisfaction categories.

13. A method, comprising:

acquiring, via a quantitative data logic, a quantitative data associated with a website;

acquiring, via the quantitative data logic, a qualitative data associated with the website;

producing, via a training logic including configured hardware, a satisfaction categorization data based on partitioning the quantitative data and the qualitative data into satisfaction categories;

identifying, via the training logic, unique pages of the website;

identifying, via the training logic, one-step transitions between unique pages;

establishing, via the training logic including hardware, a prototype as a sequence of one-step transitions between unique pages in either direction in one click that exceed a threshold quantity;

associating, via the training logic, the prototype with one of the satisfaction categories;

predicting, via a classification logic, a user satisfaction level based on session-level page sequence data associated with an ongoing website visit and the prototype for the satisfaction categories; and selecting, via a prediction logic, an action responsive to the predicted user satisfaction level during the ongoing website visit.

14. The method of claim 13, wherein the quantitative data comprises one or more of, a set of unique page transitions resulting in a prototype page sequence for satisfied customers and a prototype page sequence for unsatisfied customers, a count of page visits, a count of site conversions, a count of site abandonments, an average site visit time, an average page visit time, and an average page sequence length.

15. The method of claim 13, wherein the qualitative data comprises one or more of, an overall satisfaction data, a navigation satisfaction data, an ease of use satisfaction data, and a quality of use satisfaction data.

16. The method of claim 13, wherein producing, via the training logic, the satisfaction categorization data includes:

acquiring a set of user satisfaction data;

partitioning the set of user satisfaction data into two classes of satisfaction data, a first category and a second category;

identifying unique pages in the first category;

identifying unique pages in the second category;

retaining in the first category unique page one-step transitions in either direction appearing more than a threshold number of times, the unique page one-step transitions in either direction occurring between unique pages in the first category;

retaining in the second category unique page one-step transitions in either direction appearing more than the threshold number of times, the unique page one-step transitions in either direction occurring between unique pages in the second category;

establishing sets of retained unique page one-step transitions as prototype transitions for the first category; and establishing sets of retained unique page one-step transitions as prototype transitions for the second category.

17. The method of claim 13, wherein the session-level page sequence data comprises one or more page identifiers configured to identify a sequence of pages visited during the current website visit.

18. The method of claim 17, wherein predicting, via a classification logic, the user satisfaction level is based, at least in part, on a probability that the current website visit matches a category described in the satisfaction categorization data, the probability being computed using a first order Markov chain associated with unique page transitions in either direction identified in the session-level page sequence data and in the satisfaction categorization data.

19. The method of claim 13, wherein the action includes one or more of, offering a discount in a current session, offering a discount in a future session related to the current session, and making an offer in a future session related to the current session.

20. The method of claim 13, further comprising rating, via an overall satisfaction logic, website performance with respect to effectiveness as a sales tool based on the satisfaction categorization data.

21. The system of claim 13, further comprising producing, via the training logic, a satisfaction categorization data based on associating the prototype with one of the satisfaction categories based on customer feedback other than actions taken during the ongoing website visit.

22. A method, comprising:

acquiring, via a quantitative data logic, a quantitative website usage data;

acquiring, via a qualitative data logic, a qualitative website satisfaction data;

creating, via a training logic including configured hardware, a satisfaction categorization data from the quantitative website usage data and the qualitative website satisfaction data;

predicting, via the classification logic, a user satisfaction level associated with a current website visit based, at least in part, on partitioning the satisfaction categorization data into satisfied and unsatisfied satisfaction categories;

identifying, via a training logic including configured hardware, unique pages;

identifying, via a training logic including configured hardware, one-step transitions between unique pages in either direction in one click; and establishing, via a training logic including configured hardware, a prototype page sequence of one-step transitions between unique pages in either direction in one click that exceed a threshold quantity for each of a satisfied and unsatisfied satisfaction categories.

23. A method, comprising:

acquiring, via a quantitative data logic, a quantitative data associated with a website, the quantitative data comprising one or more of, a count of page visits, a count of site conversions, a count of site abandonments, an average site visit time, an average page visit time, and an average page sequence length;

acquiring, via a qualitative data logic, a qualitative data associated with the website, the qualitative data comprising one or more of, an overall satisfaction data, a navigation satisfaction data, an ease of use satisfaction data, and a quality of use satisfaction data;

producing, via a training logic including configured hardware, a satisfaction categorization data based on partitioning the quantitative data and the qualitative data into satisfaction classes, the training logic being configured to produce the satisfaction categorization data by:
  acquiring a set of user satisfaction data;
  partitioning the set of user satisfaction data into two classes of satisfaction data, a first category and a second category;
  identifying unique pages in the first category;
  identifying unique pages in the second category;
  retaining in the first category one-step transitions between unique pages in either direction in one click that appear more than a threshold number of times, the one-step transitions occurring between unique pages in the first category;
  retaining in the second category one-step transitions between unique pages in either direction in one click that appear more than the threshold number of times, the one-step transitions occurring between unique pages in the second category;
  establishing sets of retained one-step transitions between unique pages in either direction as prototype transitions for the first category; and
  establishing sets of retained one-step transitions between unique pages in either direction as prototype transitions for the second category;

receiving, via a classification logic, a session-level page sequence data associated with a current website visit;

producing, via the classification logic, a predicted user satisfaction level based on the session-level page sequence data and the satisfaction categorization data, the session-level page sequence data comprising one or more page identifiers configured to identify a sequence of pages visited during the current website visit;

producing, via the classification logic, the predicted user satisfaction level based, at least in part, on a probability that the current website visit matches a category described in the satisfaction categorization data, the probability being computed using a first order Markov chain associated with transitions between unique pages in either direction in one click identified in the session-level page sequence data and in the satisfaction categorization data; and selectively determining, via a prediction logic, an action to take in response to the predicted user satisfaction level during the current website visit.

* * * * *